Feb. 8, 1938. W. H. VAN BUSKIRK 2,107,590
INSULATED MILK BOTTLE CONTAINER
Filed July 30, 1936

Inventor
Wm. H. Van Buskirk
By Albert E. Dieterich
Attorney

Patented Feb. 8, 1938

2,107,590

UNITED STATES PATENT OFFICE 2,107,590

INSULATED MILK BOTTLE CONTAINER

William Harold Van Buskirk, Vancouver, British Columbia, Canada, assignor of one-half to Oliver Beaulieu, Vancouver, British Columbia, Canada Application July 30, 1936, Serial No. 93,469

1 Claim. (Cl. 232—41)

This invention is in relation to improvements in milk bottle containers and is designed specifically as improvements upon United States Patents, No. 2,022,226 and No. 2,023,826, granted me on November 26th and December 10th, 1935 respectively, and also upon pending applications filed by me on December 2nd, 1935, under Serial No. 52,582, Patent No. 2,084,228, dated June 15, 1937, and No. 52,583 respectively.

The specific improvements in the present application over the patents granted as aforesaid, and over my pending applications, are first in relation to the container proper which, in the present application, is insulated all over, including the door.

Other specific improvements are to be found in the matter of the suspension of extra milk bottles below the container proper which, in the present application, are found attached to the main stationary part of the body and not to a hinged portion of the body as in my previous patents and applications for patents.

Other improvements lie in the manner of sealing the door to make the same dust and draught proof by providing an insulating ring of sponge rubber therearound.

Still another improvement is to be found in the loose bottom of the container proper by which easy access is had to the locking mechanism of the door, and all of these and further improvements will be recited and set out in the following specification and claim and referred to in the accompanying drawing forming part of this application, and in which:

Figure 1 is a perspective view of insulated milk bottle container mounted upon a wall adjacent a doorway. This view illustrates container open, exposing to view two channel slides below bottom of container for hanging extra milk bottles in.

Figure 1:
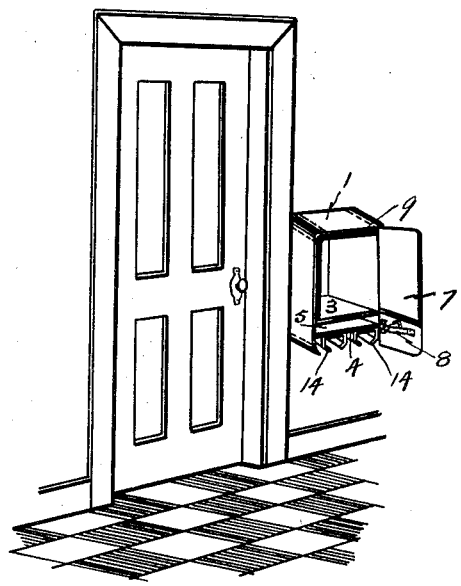
Figure 2:
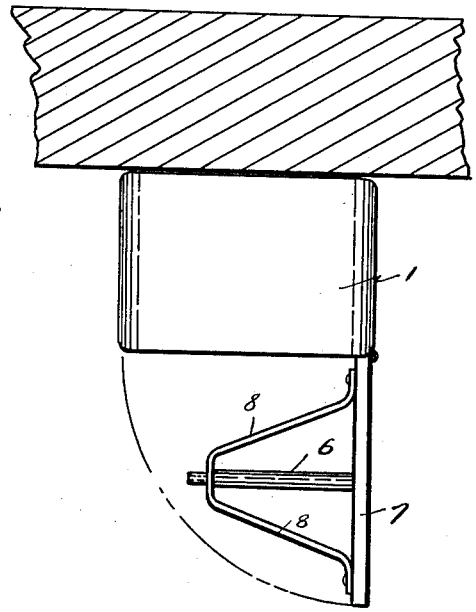
Figure 2 is an enlarged plan view of top of cabinet with door open to illustrate mounting of spring bolt upon door.
Figure 3:
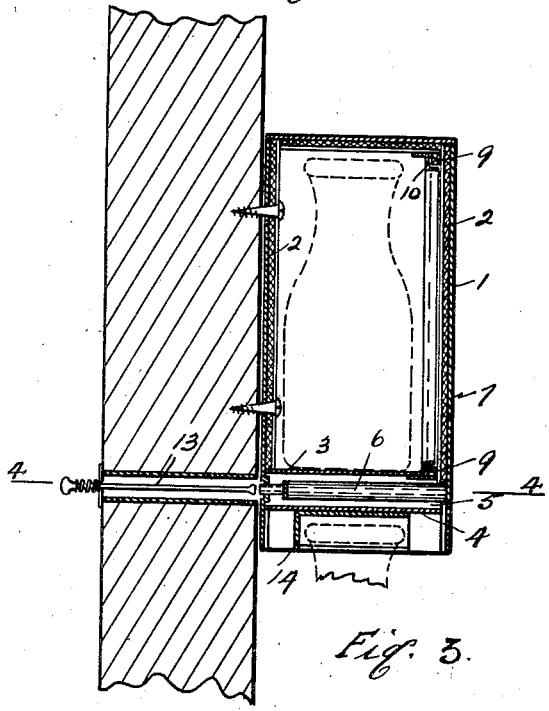
Figure 3 is a sectional detail view of insulated container mounted upon a wall and illustrates plunger rod mounted in wall by which spring bolt may be depressed to allow door of container to open. This view illustrates the insulation of the container proper and indicates milk bottle in the container and another milk bottle suspended below the bottom of container.

In these views like numerals indicate like parts and the numeral 1 indicates the outside casing of a container having insulation 2 provided upon its inner walls and top to provide a container free from rapid temperature changes.

A loose bottom 3 is provided to the container itself which is suitably supported above the main bottom 4 of the container proper.

A space 5 is provided between the main bottom 4 and loose bottom 3 to allow of the spring bolt 6 mounted upon the inner side of the door 7 of the container to operate therebetween.

The spring bolt 6 is secured upon the door by a supporting frame 8. The door 7 is hinged to one side of the container proper and is insulated after the manner of the container itself.

Surrounding the outer and open side of the container, and in effect comprising the door jamb, is a sponge rubber seal 9 on which the door 7 seats when closed. The back of the sponge rubber seal 9 abuts against the metal frame 10 surrounding and holding the insulation 2 of the container proper.

Figure 4:
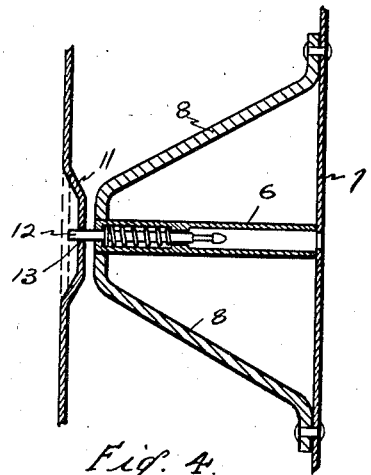
Figure 4 is a detail and sectional view of container only, taken on line 4—4 of Figure 3 to illustrate spring locking bolt and its keeper.

A portion of the back of the container proper, between the main bottom 4 and loose bottom 3, has a section sheared and pressed inwardly as at 11 Figure 4 to comprise a keep 13 to the end 12 of the spring bolt 6 whereby the door 7 may be locked to close the container.

The spring bolt 6 is released from its keep 13 by means of a "key" such as is described in my previous patents and applications for patents.

The door 7 of the container may also be opened from the inside of the wall on which the container is mounted by means of a plunger rod 13 mounted in the wall opposite the end 12 of the spring bolt by which the bolt may be sprung out of its keep 13.

Mounted below the main bottom 4 of the container is a pair of channel slides 14 adapted to receive the top rim and neck of milk bottles by which they may be supported.

The milk bottles are mounted in the channel slides 14 when the door 7 is open and after the door is closed and locked the milk bottles cannot be removed until the door 7 is again opened as the lower edge of the door extends down to cover the open ends of the channel slides.

The insulation 2 of the container and door only extends down to a level of the removable shelf or bottom 3.

The container proper of the present application is of a size adapted to receive two or more bottles upon the inside thereof and this makes it convenient to receive other parcels than milk bottles, as the latter can be mounted in the channel slides 14 while leaving the container itself to receive other goods.

Having now described my invention and the nature of same, what I claim and desire to be protected in, by Letters Patent, is:

An insulated container including a hinged door, means to mount said container on a wall having an opening, said container also having an opening to register with the opening in said wall, a latch device carried by said door and including a spring bolt to enter said container opening to lock the door shut, said door having an opening through which a latch releasing implement may be inserted to release said latch from the outside, and means in the opening of said wall by which said latch may be released from the wall side.

WILLIAM HAROLD VAN BUSKIRK.